(No Model.)

R. N. LAWRENCE.
DRAFT EQUALIZER.

No. 512,831. Patented Jan. 16, 1894.

Witnesses
A. Ruppert.
G. M. Copenhaver.

Inventor
Richard N. Lawrence
Per
Thomas P. Simpson
Attorney

UNITED STATES PATENT OFFICE.

RICHARD N. LAWRENCE, OF ZEARING, IOWA.

DRAFT-EQUALIZER.

SPECIFICATION forming part of Letters Patent No. 512,831, dated January 16, 1894.

Application filed April 29, 1893. Serial No. 472,318. (No model.)

*To all whom it may concern:*

Be it known that I, RICHARD N. LAWRENCE, a citizen of the United States, residing at Zearing, in the county of Story and State of Iowa, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a draft equalizer by which three or four horses may be hitched to a harvester so that each will pull his proportion while the side-draft will be to a great extent avoided.

The invention will first be described in connection with the drawings and then pointed out in the claim.

Figure 1:
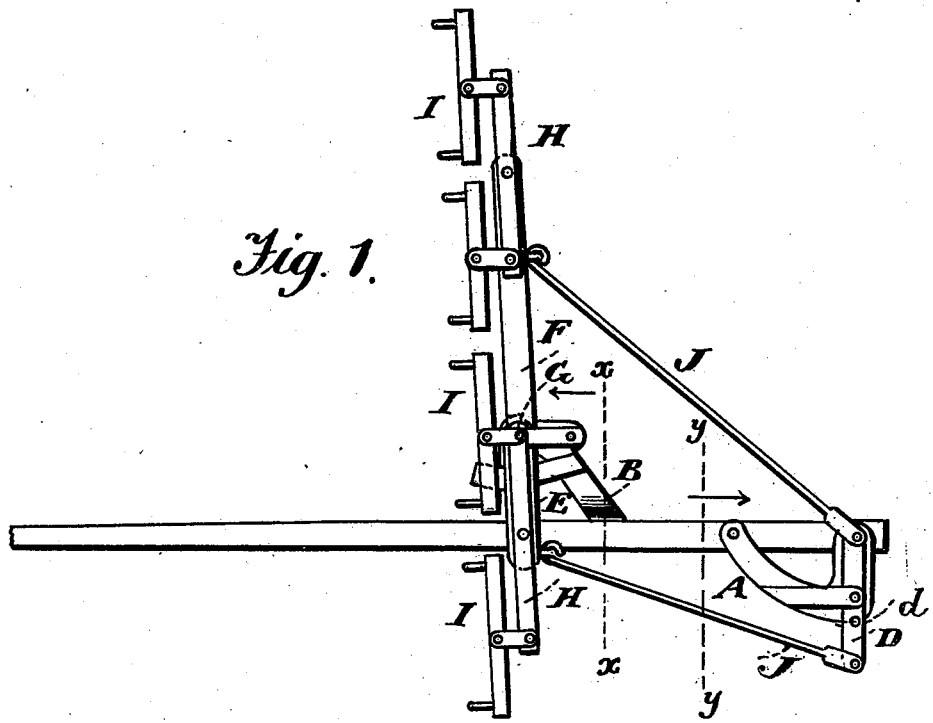
Figure 2:
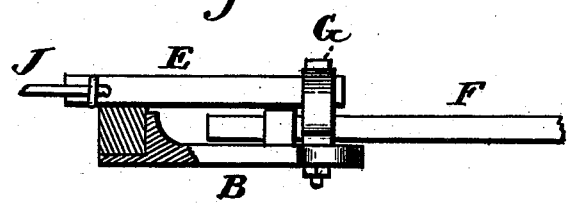
Figure 3:
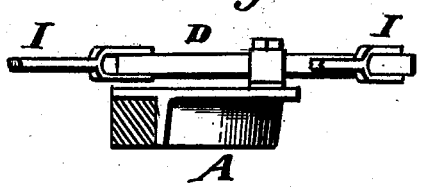

Figure 1 of the drawings is a plan view, showing my equalizer on the pole of a harvester; Fig. 2 a vertical cross-section on the dotted line x x of Fig. 1, and Fig. 3 a vertical cross-section on the dotted line y y of Fig. 1.

In the drawings A and B represent two brackets fastened on opposite sides of the harvester, the bracket A being placed in the rear of the bracket B as shown in Fig. 1 of the drawings. On the bracket A is fulcrumed an equal-armed lever D and on the bracket B are pivoted the two arms E F as shown in Fig. 2 of the drawings each pivoted on the same bolt G and each carrying a doubletree H not at the same distance from the bolt G. The one on the arm F is twice as far from pivot G as the one on the arm E. The equal-armed lever D is provided with an extra fulcrum hole d which is to be used when three horses only are used. Then instead of the double-tree on the right, I use a single-tree. To each of the doubletrees are pivoted two single trees I, thus allowing only one horse on that side of the pole next to the grain or grass and three horses on the off side. Each of the arms E F is connected by an end-pivoted rod J with one end of the equal-armed lever D, so that the equalizer will stand normally as shown in Fig. 1 of the drawings, the lever D, and arms E F forming opposite parallel sides while the other two sides are the rods J J which are not parallel. It will be seen that the tongue or line of draft becomes a diagonal bisection and thus brings the line of draft where it should be in that of the tongue itself.

What I claim as new, and desire to protect by Letters Patent, is—

The combination with the pole of a harvester having the brackets A B arranged as shown on opposite sides thereof, of the equal-armed lever D fulcrumed on the rear bracket A and the two levers E F connected by pivoted rods with the lever D and fulcrumed on the same bolt G, the lever F having its doubletree pivoted twice as far from the bolt G as that of the lever E; whereby the line of draft is made to coincide with the direction of the pole as set forth.

In testimony whereof I affix my signature in presence of two witnesses.

RICHARD N. LAWRENCE.

Witnesses:
E. A. ALBERTSON,
J. K. MILNER.